(12) United States Patent
Baron et al.

(10) Patent No.: US 9,700,077 B2
(45) Date of Patent: *Jul. 11, 2017

(54) ARTICLE OF APPAREL WITH VARIABLE AIR PERMEABILITY

(71) Applicant: NIKE, Inc., Beaverton, OR (US)

(72) Inventors: Michael R. Baron, Tigard, OR (US);
Karin E. Carter, Portland, OR (US);
Sophie L. Mather, Portland, OR (US);
LaShurya M. Wise, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 705 days.

This patent is subject to a terminal disclaimer.

(21) Appl. No.: 13/921,869

(22) Filed: Jun. 19, 2013

(65) Prior Publication Data

US 2014/0000004 A1    Jan. 2, 2014

Related U.S. Application Data

(63) Continuation-in-part of application No. 12/411,961, filed on Mar. 26, 2009, now abandoned, and a
(Continued)

(51) Int. Cl.
*A41B 1/00* (2006.01)
*A41D 27/28* (2006.01)
(Continued)

(52) U.S. Cl.
CPC ................ *A41B 1/00* (2013.01); *A41D 1/04* (2013.01); *A41D 27/28* (2013.01);
(Continued)

(58) Field of Classification Search
CPC . A41B 1/00; A41D 1/04; A41D 27/28; A41D 31/0033; A41D 13/0053;
(Continued)

(56) References Cited

U.S. PATENT DOCUMENTS 179,661 A     7/1876   Lee
308,244 A    11/1884   Fishel
(Continued)

FOREIGN PATENT DOCUMENTS

CN         2471305 Y     1/2002
CN        101348971      1/2009
(Continued)

OTHER PUBLICATIONS

Office Action mailed Sep. 12, 2007 for U.S. Appl. No. 11/040,165.
(Continued)

*Primary Examiner* — Alissa L Hoey
(74) *Attorney, Agent, or Firm* — Shook, Hardy & Bacon L.L.P.

(57) ABSTRACT

An article of apparel may include a torso region with a front area, a back area, and a pair of side areas. At least a portion of each of the side areas are formed from a material with (a) a first air permeability when unexposed to water and (b) a second air permeability when exposed to water. The first air permeability may be less than 279 cm$^3$/second per cm$^2$ measured in accordance with ASTM D 737, and the second air permeability may be greater than 279 cm$^3$/second per cm$^2$ measured in accordance with ASTM D 737. In some configurations, at least a portion of the back area may be formed from the material. The article of apparel may be a shirt, and the article of apparel may include arm regions that extend outward from the torso region.

5 Claims, 13 Drawing Sheets

Related U.S. Application Data continuation-in-part of application No. 12/131,624, filed on Jun. 2, 2008, now Pat. No. 8,726,414, which is a continuation of application No. 11/040,165, filed on Jan. 24, 2005, now Pat. No. 7,437,774, which is a continuation-in-part of application No. 10/839,695, filed on May 6, 2004, now Pat. No. 8,555,414, and a continuation-in-part of application No. 10/967,635, filed on Oct. 19, 2004, now abandoned, which is a continuation-in-part of application No. 10/805,681, filed on Mar. 19, 2004, now abandoned.

(51) Int. Cl.
  *A41D 31/00* (2006.01)
  *A41D 1/04* (2006.01)
  *D04B 21/16* (2006.01)
  *D02G 3/44* (2006.01)
  *A41D 13/005* (2006.01)

(52) U.S. Cl.
  CPC ........... *A41D 31/0033* (2013.01); *D02G 3/44* (2013.01); *D04B 21/16* (2013.01); *A41D 13/0053* (2013.01); *A41D 2400/20* (2013.01); *C08L 2201/12* (2013.01); *D10B 2401/02* (2013.01)

(58) Field of Classification Search
  CPC .. A41D 2400/20; D02G 3/44; D10B 2401/02; D10B 2403/011
  USPC .................................................. 2/115, DIG. 1
  See application file for complete search history.

(56) References Cited

U.S. PATENT DOCUMENTS

| | | |
|---|---|---|
| 601,489 A | 3/1898 | Tim |
| 1,118,792 A | 11/1914 | Nicholas |
| 1,252,187 A | 1/1918 | Shane |
| 1,350,169 A | 8/1920 | Mullane |
| 1,973,419 A | 9/1934 | Trageser |
| 2,391,535 A | 12/1945 | Zelano |
| 2,715,226 A | 8/1955 | Weiner |
| 2,846,687 A | 8/1958 | Lippman |
| 3,045,243 A | 7/1962 | Lash et al. |
| 3,078,699 A | 2/1963 | Huntley |
| 3,086,215 A | 4/1963 | Di Paola |
| 3,153,793 A | 10/1964 | Lepore |
| 3,265,529 A | 8/1966 | Caldwell et al. |
| 3,296,626 A | 1/1967 | Ludwikowski |
| 3,594,262 A | 7/1971 | Magidson |
| 3,607,591 A | 9/1971 | Hansen |
| 3,626,714 A | 12/1971 | Blore |
| 3,710,395 A | 1/1973 | Spano et al. |
| 3,761,962 A | 10/1973 | Myers |
| 3,801,987 A | 4/1974 | Thompson, Jr. |
| 3,971,234 A | 7/1976 | Taylor |
| 4,126,903 A | 11/1978 | Horton |
| 4,185,327 A | 1/1980 | Markve |
| 4,195,364 A | 4/1980 | Bengtsson et al. |
| 4,267,710 A | 5/1981 | Imamichi |
| 4,351,874 A | 9/1982 | Kirby |
| 4,392,258 A | 7/1983 | O'Neill |
| 4,418,524 A | 12/1983 | Ito et al. |
| 4,513,451 A | 4/1985 | Brown |
| 4,541,426 A | 9/1985 | Webster et al. |
| 4,608,715 A | 9/1986 | Miller et al. |
| 4,619,004 A | 10/1986 | Won |
| 4,638,648 A | 1/1987 | Gajjar |
| 4,722,099 A | 2/1988 | Kratz |
| 4,804,351 A | 2/1989 | Raml et al. |
| 5,033,118 A | 7/1991 | Lincoln |
| 5,095,548 A | 3/1992 | Chesebro, Jr. |
| 5,105,478 A | 4/1992 | Pyc |
| 5,192,600 A | 3/1993 | Pontrelli et al. |
| 5,206,080 A | 4/1993 | Tashiro et al. |
| 5,232,769 A | 8/1993 | Yamato et al. |
| 5,282,277 A | 2/1994 | Onozawa |
| 5,367,710 A | 11/1994 | Karmin |
| 5,469,581 A | 11/1995 | Uthoff |
| 5,515,543 A | 5/1996 | Gioelle |
| 5,636,533 A | 6/1997 | Hunneke et al. |
| 5,645,924 A | 7/1997 | Hamilton |
| 5,683,794 A | 11/1997 | Wadsworth et al. |
| 5,704,064 A | 1/1998 | Van Der Sleesen |
| 5,727,256 A | 3/1998 | Rudman |
| 5,735,145 A | 4/1998 | Pernick |
| 5,792,714 A | 8/1998 | Schindler et al. |
| 5,809,806 A | 9/1998 | Yoon et al. |
| 5,834,093 A | 11/1998 | Challis et al. |
| 5,887,276 A | 3/1999 | Lee |
| 5,908,673 A | 6/1999 | Muhlberger |
| 6,015,764 A | 1/2000 | McCormack et al. |
| 6,248,710 B1 | 6/2001 | Bijsterbosch et al. |
| 6,253,582 B1 * | 7/2001 | Driggars .................. D04B 1/14 66/202 |
| 6,319,558 B1 | 11/2001 | Willemsen |
| 6,332,221 B1 | 12/2001 | Gracey |
| 6,339,845 B1 | 1/2002 | Burns et al. |
| D457,709 S | 5/2002 | Davis |
| 6,403,216 B1 | 6/2002 | Doi et al. |
| 6,430,764 B1 | 8/2002 | Peters |
| 6,550,474 B1 | 4/2003 | Anderson et al. |
| 6,611,960 B2 * | 9/2003 | Kim ....................... A41D 27/18 2/115 |
| 6,640,715 B1 | 11/2003 | Watson et al. |
| 6,647,549 B2 | 11/2003 | McDevitt et al. |
| 6,698,510 B2 | 3/2004 | Serra et al. |
| 6,756,329 B1 | 6/2004 | Umino et al. |
| 6,767,850 B1 | 7/2004 | Tebbe |
| 6,770,579 B1 | 8/2004 | Dawson et al. |
| 7,043,766 B1 | 5/2006 | Foreman et al. |
| 7,437,774 B2 | 10/2008 | Baron et al. |
| 7,754,626 B2 | 7/2010 | Baron et al. |
| 8,187,984 B2 * | 5/2012 | Rock .................. A41D 31/0038 442/59 |
| 8,726,414 B2 * | 5/2014 | Baron ...................... A41D 1/04 2/115 |
| 9,060,551 B2 * | 6/2015 | Nordstrom ............... A41D 1/00 |
| 2002/0164474 A1 | 11/2002 | Buckley |
| 2002/0189608 A1 | 12/2002 | Raudenbush |
| 2003/0061650 A1 | 4/2003 | Emanuel |
| 2005/0053759 A1 * | 3/2005 | Rock .................. A41D 31/00 428/91 |
| 2005/0204448 A1 | 9/2005 | Wise et al. |
| 2005/0204449 A1 | 9/2005 | Baron et al. |
| 2005/0208266 A1 | 9/2005 | Baron et al. |
| 2005/0208283 A1 | 9/2005 | Baron et al. |
| 2005/0208850 A1 | 9/2005 | Baron et al. |
| 2005/0208857 A1 | 9/2005 | Baron et al. |
| 2005/0208859 A1 | 9/2005 | Baron et al. |
| 2005/0208860 A1 | 9/2005 | Baron et al. |
| 2005/0246813 A1 | 11/2005 | Davis et al. |
| 2006/0223400 A1 | 10/2006 | Yasui et al. |
| 2006/0230490 A1 | 10/2006 | Okajima |
| 2006/0270293 A1 | 11/2006 | Yasui et al. |
| 2008/0057809 A1 * | 3/2008 | Rock .................. A41D 31/0038 442/64 |
| 2008/0229473 A1 | 9/2008 | Baron et al. |
| 2010/0242151 A1 | 9/2010 | Mather |

FOREIGN PATENT DOCUMENTS

| | | |
|---|---|---|
| DE | 1 435 981 | 3/1969 |
| DE | 27 02 407 A1 | 7/1978 |
| DE | G 85 33 733.1 | 5/1986 |
| DE | 196 19 858 A1 | 11/1997 |
| EP | 1050323 A1 | 11/2000 |
| EP | 1054095 A1 | 11/2000 |
| EP | 1640488 A1 | 3/2006 |
| EP | 1803844 A1 | 7/2007 |
| EP | 1852249 A1 | 11/2007 |

(56) References Cited

FOREIGN PATENT DOCUMENTS

| | | |
|---|---|---|
| EP | 2410883 | 2/2012 |
| GB | 2 108 822 A | 5/1983 |
| GB | 2 193 429 A | 2/1988 |
| GB | 2 254 044 B | 9/1992 |
| GB | 2 333 724 | 7/2002 |
| JP | 60-252746 | 12/1985 |
| JP | 60-252756 | 12/1985 |
| JP | 62-162043 | 7/1987 |
| JP | 2003-41462 | 2/2003 |
| JP | 2003-082555 | 3/2003 |
| JP | 2004-360094 | 12/2004 |
| JP | 2005-036374 | 2/2005 |
| SE | 198705 A | 3/1965 |
| WO | WO9216434 A1 | 10/1992 |
| WO | WO9905926 A1 | 2/1999 |
| WO | WO2004113599 A1 | 12/2004 |
| WO | WO2004113601 A1 | 12/2004 |
| WO | WO2005010258 A1 | 2/2005 |
| WO | WO2005038112 A1 | 4/2005 |
| WO | WO2006041200 A1 | 4/2006 |
| WO | WO2006043677 A1 | 4/2006 |
| WO | WO2006090808 A1 | 8/2006 |
| WO | WO2010110979 A1 | 9/2010 |

OTHER PUBLICATIONS

Office Action mailed Oct. 16, 2007 for U.S. Appl. No. 10/805,681.
Office Action mailed Nov. 26, 2007 for U.S. Appl. No. 11/040,165.
Office Action mailed Dec. 11, 2007 for U.S. Appl. No. 11/052,996.
Office Action mailed Mar. 31, 2008 for U.S. Appl. No. 10/967,635.
Office Action mailed Apr. 7, 2008 for U.S. Appl. No. 11/040,165.
Office Action mailed May 15, 2008 for U.S. Appl. No. 11/052,996.
Notice of Allowance mailed Jun. 13, 2008 for U.S. Appl. No. 11/040,165.
Office Action mailed Jun. 16, 2008 for U.S. Appl. No. 11/052,996.
Office Action mailed Jun. 27, 2008 for U.S. Appl. No. 11/053,074.
Office Action mailed Jul. 1, 2008 for U.S. Appl. No. 11/053,705.
Office Action mailed Jul. 1, 2008 for U.S. Appl. No. 11/053,120.
Office Action mailed Sep. 25, 2008 for U.S. Appl. No. 11/053,120.
Office Action mailed Nov. 13, 2008 for U.S. Appl. No. 10/967,635.
International Preliminary Report on Patentability and Written Opinion of the International Searching Authority in International Patent Application No. PCT/US2010/024903, mailed Oct. 6, 2011.
Applicant's Response to Communication Issued Under Rules 161(1) and 162 EPC dated May 11, 2012 in European Patent Application No. 10712596.5.
Office Action issued in Chinese Patent Application No. 201080012549.2 dated Apr. 2, 2013 (no translation available).
Office Action mailed Dec. 9, 2009 in connection with U.S. Appl. No. 12/131,624.
Applicant's Response to Office Action filed Dec. 18, 2009 in connection with U.S. Appl. No. 12/131,624.
Office Action mailed Feb. 2, 2010 in connection with U.S. Appl. No. 12/131,624.
Applicant's Response to Office Action filed Mar. 2, 2010 in connection with U.S. Appl. No. 12/131,624.
Office Action mailed May 18, 2010 in connection with U.S. Appl. No. 12/131,624.
Applicant's Response to Office Action filed Aug. 18, 2010 in connection with U.S. Appl. No. 12/131,624.
Final Office Action mailed Oct. 7, 2010 in connection with U.S. Appl. No. 12/131,624.
Applicant's Response to Final Office Action filed Dec. 7, 2010 in connection with U.S. Appl. No. 12/131,624.
Advisory Action mailed Dec. 20, 2010 in connection with U.S. Appl. No. 12/131,624.
Applicant's Request for Continued Examination and Amendment filed Jan. 6, 2011 in connection with U.S. Appl. No. 12/131,624.
Final Office Action mailed Feb. 8, 2011 in connection U.S. Appl. No. 12/131,624.
Applicant's Notice of Appeal filed Mar. 31, 2011 in connection with U.S. Appl. No. 12/131,624.
Applicant's Pre-Appeal Brief filed Mar. 31, 2011 in connection with U.S. Appl. No. 12/131,624.
Notice of Panel Decision mailed Jun. 2, 2011 in connection with U.S. Appl. No. 12/131,624.
Applicant's Appeal Brief filed Jul. 5, 2011 in connection with U.S. Appl. No. 12/131,624.
Examiner's Answer to Appeal Brief mailed Sep. 6, 2011 in connection with U.S. Appl. No. 12/131,624.
Applicant's Reply Brief to Examiner's Answer filed Nov. 7, 2011 in connection with U.S. Appl. No. 12/131,624.
Notice for Appeal Board mailed Nov. 16, 2011 in connection with U.S. Appl. No. 12/131,624.
Office Action mailed Oct. 4, 2011 in connection with U.S. Appl. No. 12/411,961.
Applicant's Substance of Interview Statement filed Jan. 23, 2012 in connection with U.S. Appl. No. 12/411,961.
Applicant's Response to Office Action filed Jan. 23, 2012 in connection with U.S. Appl. No. 12/411,961.
Final Office Action mailed Feb. 2, 2012 in connection with U.S. Appl. No. 12/411,961.
Applicant's Response to Final Office Action filed Mar. 22, 2012 in connection with U.S. Appl. No. 12/411,961.
Advisory Action mailed Mar. 29, 2012 in connection with U.S. Appl. No. 12/411,961.
Applicant's Request for Continued Examination and Amendment filed May 2, 2012 in connection with U.S. Appl. No. 12/411,961.
Final Office Action mailed Jun. 6, 2012 in connection with U.S. Appl. No. 12/411,961.
Applicant's Response to Final Office Action filed Aug. 3, 2012 in connection with U.S. Appl. No. 12/411,961.
Interview Summary mailed Jul. 26, 2012 in connection with U.S. Appl. No. 12/411,961.
Advisory Action mailed Aug. 7, 2012 in connection with U.S. Appl. No. 12/411,961.
Applicant's Request for Continued Examination and Amendment filed Sep. 6, 2012 in connection with U.S. Appl. No. 12/411,961.
Office Action mailed Nov. 8, 2012 in connection with U.S. Appl. No. 12/411,961.
Applicant's Response to Office Action filed Feb. 8, 2013 in connection with U.S. Appl. No. 12/411,961.
Final Office Action mailed Mar. 19, 2013 in connection with U.S. Appl. No. 12/411,961.
International Search Report and Written Opinion for PCT Application No. PCT/US2005/012209 mailed Jul. 14, 2005.
Internet printout: http://realtytimes.com/rtapages/20020906_trendtalk, dated Mar. 24, 2004.
"Standard Test Method for Air Permeability of Textile Fabrics", ASTM D 737-04 (Reapproved Aug. 2008).
Mitsubishi Rayon: Changeable fiber stretches with moisture; Asian Textile Business; Sep. 1, 2003.
Internet printout: http://niketown.nike.com/Nike Pro Vent Dri-FIT Long Sleeve Top, dated Mar. 22, 2004.
Internet printout: http://niketown.nike.com/Nike Pro Vent Dri-FIT Short-Sleeve Top, dated Mar. 22, 2004.
Internet printout: http://niketown.nike.com: Nike Pro Vent Dri-FIT Sleeveless Top, dated Mar. 22, 2004.
Internet printout: http://niketown.nike.com: DRI-FIT One Mesh Tank, dated Mar. 22, 2004.
Internet printout: http://niketown.nike.com: Nike Sphere Switchback Long-Sleeve, dated Mar. 22, 2004.
Internet printout: http://niketown.nike.com: UV Dri-FIT Long-Sleeve Top, dated Mar. 22, 2004.
Internet printout: http://niketown.nike.com: DRI-FIT One Long Short, dated Mar. 22, 2004.
Internet printout: http://niketown.nike.com: Nike Sphere Ultralight Tank, dated Mar. 22, 2004.
Internet prinout: http://niketown.nike.com: Nike Sphere Yoked Sleeveless Top, dated Apr. 9, 2004.
Internet printout: http://niketown.nike.com: Nike Sphere Switchback Short-Sleeve, dated Apr. 9, 2004.

(56) References Cited

OTHER PUBLICATIONS

Internet printout: http://niketown.nike.com: New Sphere Yoked Short-Sleeve Top, dated Apr. 9, 2004.
Internet printout: http://niketown.nike.com: Nike Sphere Ultralight Top, dated Apr. 9, 2004.
Internet printout: http://niketown.nike.com: Nike Sphere Dry Crew, dated Apr. 9, 2004.
Internet printout: http://niketown.nike.com: Global Nike Sphere Top, dated Apr. 9, 2004.
Internet printout: http://niketown.nike.com: Global Nike Sphere Polo, dated Apr. 9, 2004.
Internet printout: http://niketown.nike.com: Nike Sphere Switchback Long-Sleeve, dated Apr. 9, 2004.
Internet printout: http://niketown.nike.com: Nike Sphere Warm-Up, dated Apr. 9, 2004.
Internet printout: http://niketown.nike.com: Nike Sphere Ultralight Tank, dated Apr. 9, 2004.
Office Action mailed Apr. 20, 2005 for U.S. Appl. No. 10/805,681.
International Search Report and Written Opinion for PCT/US2005/005191 mailed on Jun. 6, 2005.
Office Action mailed Aug. 10, 2005 for U.S. Appl. No. 11/052,996.
International Preliminary Report on Patentability and Written Opinion in International Patent Application No. PCT/US2005/012209 dated Nov. 3, 2005.
Office Action mailed Nov. 14, 2005 for U.S. Appl. No. 10/805,681.
Office Action mailed Jan. 25, 2006 for U.S. Appl. No. 11/052,996.
International Search Report and Written Opinion in International Patent Application No. PCT/US2005/035831 mailed Jan. 26, 2006.
Office Action mailed May 5, 2006 for U.S. Appl. No. 10/805,681.
Office Action mailed May 18, 2006 for U.S. Appl. No. 11/052,996.
Office Action mailed Oct. 13, 2006 for U.S. Appl. No. 10/805,681.
Office Action mailed Nov. 2, 2006 for U.S. Appl. No. 11/052,996.
Office Action mailed Jan. 16, 2007 for U.S. Appl. No. 10/805,681.
Office Action mailed Feb. 7, 2007 for U.S. Appl. No. 10/967,635.
Office Action mailed Apr. 9, 2007 for U.S. Appl. No. 11/053,705.
Office Action mailed Apr. 9, 2007 for U.S. Appl. No. 11/053,074.
Office Action mailed Apr. 9, 2007 for U.S. Appl. No. 11/053,120.
Office Action mailed May 4, 2007 for U.S. Appl. No. 10/967,635.
Office Action mailed Jun. 27, 2007 for U.S. Appl. No. 11/052,996.
Office Action mailed Aug. 20, 2007 for U.S. Appl. No. 10/967,635.
Office Action dated Jun. 3, 2016 in U.S. Appl. No. 14/252,524, 17 pages.
Final Office Action dated Nov. 25, 2016 in U.S. Appl. No. 14/252,524, 16 pages.

* cited by examiner

ARTICLE OF APPAREL WITH VARIABLE AIR PERMEABILITY

CROSS-REFERENCE TO RELATED APPLICATIONS

This non-provisional U.S. Patent Application is a continuation-in-part application and claims priority to (a) U.S. patent application Ser. No. 12/411,961, which was filed in the U.S. Patent and Trademark Office on 26 Mar. 2009 and entitled Article Of Apparel With Variable Air Permeability, and (b) U.S. patent application Ser. No. 12/131,624, which was filed in the U.S. Patent and Trademark Office on 2 Jun. 2008 and entitled Article Of Apparel Incorporating A Zoned Modifiable Textile Structure, such prior U.S. Patent Applications being entirely incorporated herein by reference. U.S. patent application Ser. No. 12/131,624 is a continuation application and claims priority to U.S. patent application Ser. No. 11/040,165, which was filed in the U.S. Patent and Trademark Office on 24 Jan. 2005 and entitled Article Of Apparel Incorporating A Zoned Modifiable Textile Structure, such prior U.S. Patent Application being entirely incorporated herein by reference. U.S. patent application Ser. No. 11/040,165 is a continuation-in-part application and claims priority to (a) U.S. patent application Ser. No. 10/839,695, which was filed in the U.S. Patent and Trademark Office on 6 May 2004 and entitled Article Of Apparel Utilizing Zoned Venting And/Or Other Body Cooling Features Or Methods and (b) U.S. patent application Ser. No. 10/967,635, which was filed in the U.S. Patent and Trademark Office on 19 Oct. 2004 and entitled Article Of Apparel Incorporating A Modifiable Textile Structure, which is also a continuation-in-part application of and claims priority to U.S. Patent application Ser. No. 10/805,681, which was filed in the U.S. Patent and Trademark Office on 19 Mar. 2004 and entitled Article Of Apparel Incorporating A Modifiable Textile Structure, such prior U.S. Patent Applications being entirely incorporated herein by reference.

BACKGROUND

As an individual engages in an athletic activity, including either practice sessions or competitions, the temperature of the individual may increase as time proceeds and the level of athletic activity increases. Many articles of apparel are designed to moderate or delay increases in the temperature of the individual. As an example, the apparel may incorporate materials that are specifically selected to promote cooling of the skin temperature of the individual. Commonly, such materials (e.g., a mesh textile) may exhibit a relatively high air permeability that permits air to enter the apparel through the material and circulate between the apparel and the individual, thereby convecting heat away from the individual.

SUMMARY

Various configurations of an article of apparel are disclosed below. In general, the article of apparel may include a torso region with a front area, a back area, and a pair of side areas. At least a portion of each of the side areas are formed from a material with (a) a first air permeability when unexposed to water and (b) a second air permeability when exposed to water. The first air permeability is less than 279 $cm^3$/second per $cm^2$ measured in accordance with ASTM D737, and the second air permeability is greater than 279 $cm^3$/second per $cm^2$ measured in accordance with ASTM D737. In some configurations, at least a portion of the back area is formed from the material. The article of apparel may be a shirt, and the article of apparel may include arm regions that extend outward from the torso region.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

DETAILED DESCRIPTION

The following discussion and accompanying figures disclose various articles of apparel that incorporate a material (e.g., a textile) with a variable air permeability. When the material is dry or otherwise unexposed to water, the air permeability of the material is at a minimum. When the material is wet or otherwise exposed to water (e.g., due to perspiration from the wearer), however, the air permeability increases and allows a greater volume of air to flow through the apparel. The ability of air to flow through the material changes, therefore, depending upon whether the material is relatively dry or relatively wet. Moreover, the variable air permeability permits greater quantities of air to enter the apparel to remove water from perspiration when the perspiration is present, but restricts the quantity of air that enters the apparel when the perspiration is absent. "Air permeability," as used in this specification, means the volume of air (e.g., in cubic feet) that passes through a given area of the material tested (e.g., a square foot) in a given time period (e.g., a minute) under predetermined testing conditions. While various ways of measuring air permeability of a material are known and may be used, one suitable method of measuring air permeability involves the use of a Frazier Low Pressure Air Permeability Machine 750 using standard test ASTM D737-96.

General Apparel Configuration

Figure 1:
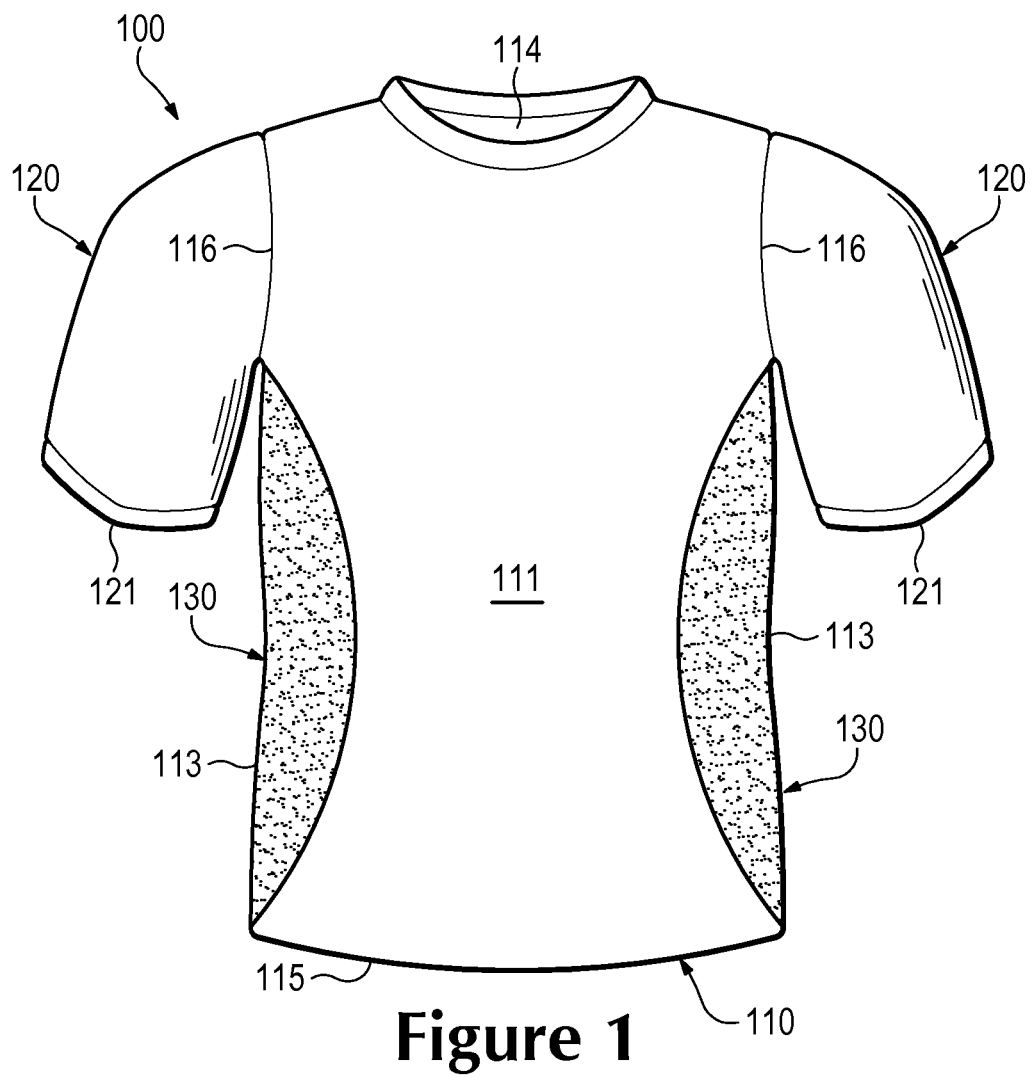
FIG. 1 is a front elevational view of an article of apparel incorporating a textile with a variable air permeability.
Figure 2:
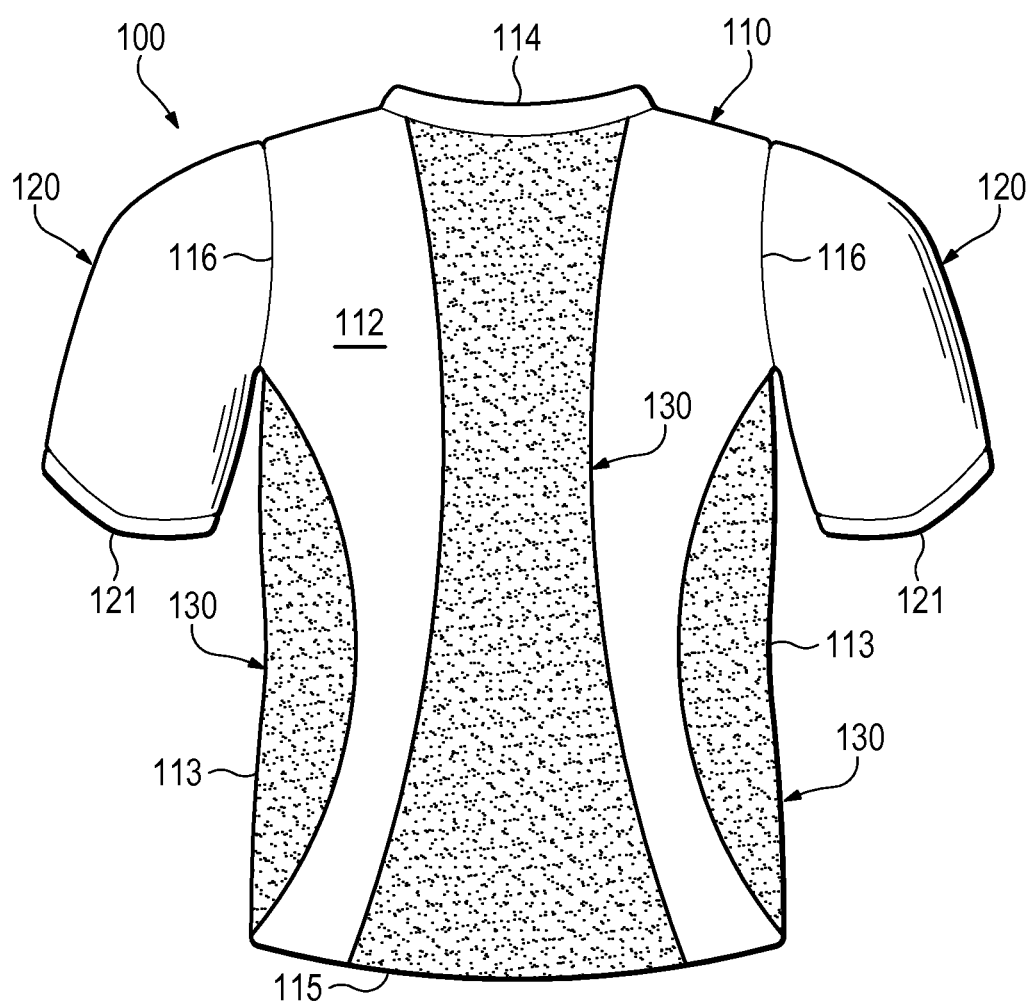
FIG. 2 is a rear elevational view of the article of apparel.

An article of apparel 100 is depicted in FIGS. 1 and 2 as including a torso region 110 and a pair of arm regions 120 that extend outward from torso region 110. Whereas torso region 110 corresponds with a torso of an individual wearing apparel 100 and covers at least a portion of the torso when worn, arm regions 120 respectively correspond with arms of the individual and cover at least a portion of the arms when apparel 100 is worn. Apparel 100 is depicted in FIGS. 1 and 2 as having the configuration of a shirt-type garment, particularly a short-sleeved shirt. In general, shirt-type garments cover a portion of a torso of the individual and may extend over arms of the individual. In further examples, apparel having the general structure of apparel 100 and incorporating concepts discussed below for apparel 100 may have the configuration of other shirt-type garments, including various long-sleeved shirts, tank tops, undershirts, jackets, or coats.

Torso region 110 may be divided into various areas for purposes of reference, including a front area 111, a back area 112, and a pair of side areas 113. Front area 111 generally corresponds with a chest and front abdomen of an individual wearing apparel 100. Back area 112 generally corresponds with a back of the individual. Similarly, side areas 113 generally correspond with sides of the individual. Whereas front area 111 is positioned opposite back area 112, side areas 113 extend between or separate portions of front area 111 and back area 112. Areas 111-113 are not intended to demarcate precise areas of apparel 100. Rather, areas 111-113 are intended to represent general areas of apparel 100 to aid in the following discussion.

An upper portion of torso region 110 defines a neck opening 114 through which the neck and head of the individual protrude when apparel 100 is worn. A lower area of torso region 110 defines a waist opening 115 through which the waist or pelvic area of the individual protrudes when apparel 100 is worn. In addition, torso region 110 defines a pair of arm openings 116 through which the arms of the individual protrude when apparel 100 is worn. Arm regions 120 extend outward from torso region 110 and, more particularly, extend outward from arm openings 116. Referring to FIGS. 1 and 2, the locations of arm openings 116 are depicted as corresponding with seams that join each of arm regions 120 to torso region 110. That is, arm openings 116 correspond with seams that join textile elements (or other material elements) from each of arm regions 120 to textile elements forming torso region 110. In some configurations of apparel 100, arm regions 120 may be joined to torso region 110 in a seamless manner. Each of arm regions 120 define an opening 121, located opposite arm openings 116, through which the hands, wrists, or arms of the wearer protrude when apparel 100 is worn.

Apparel 100 is formed from a plurality of textile or other material elements that are joined in a conventional manner (i.e., stitching, adhesive bonding, heat bonding) to form torso region 110 and arm regions 120. Referring to the configuration depicted in FIGS. 1 and 2, a majority of front area 111, back area 112, and arm regions 120 are formed from substantially conventional textile or other material elements. That is, front area 111, back area 112, and arm regions 120 may be formed from woven, knitted, or non-woven textiles formed from cotton, polyester, rayon, or a variety of other natural or synthetic materials that are conventionally utilized in articles of apparel. In some configurations, portions of torso region 110 and arm regions 120 may be formed from non-textiles (e.g., polymer sheets) or layered materials that include combinations of textile and/or other material layers. Additionally, zippers, buttons, or pockets may be incorporated into apparel 100.

Although conventional textiles or other conventional materials may be utilized in apparel 100, portions of back area 112 and side areas 113 are at least partially formed from various elements of a textile 130. For purposes of reference in FIGS. 1 and 2, as well as other figures, textile 130 is depicted as having a stippled or otherwise dotted appearance to distinguish textile 130 from other materials forming apparel 100. An advantage of textile 130 over various conventional textiles and other materials relates to air permeability. More particularly, the air permeability of textile 130 changes depending upon whether textile 130 is unexposed to water (i.e., relatively dry) or exposed to water (i.e., damp, wet, saturated). In general, the air permeability of textile 130 when unexposed to water is less the air permeability of textile 130 when exposed to water. Accordingly, (a) when textile 130 is dry, the air permeability of textile 130 is at a minimum and (b) when textile 130 is damp, wet, or saturated with water, the air permeability of textile 130 is at a maximum.

Variable Air Permeable Textile

As discussed in the Background section above, many articles of apparel incorporate materials that are specifically selected to promote cooling of the individual, and such materials may exhibit a relatively high air permeability that (a) convects heat away from the individual and (b) promotes evaporative cooling through the removal of perspiration. Mesh materials, which are commonly used to permit air to circulate between the apparel and the individual, exhibit a relatively constant air permeability. That is, mesh materials exhibit a relatively high air permeability as an individual is resting, warming-up, engaging in an athletic activity, and warming-down. Although mesh materials promote cooling when the individual is engaging in the athletic activity, mesh materials may also promote cooling during times when the individual may be concerned with conserving heat (e.g., during resting, warm-up, and warm-down periods). Accordingly, the relatively constant air permeability of mesh materials may promote cooling at times when a decrease in temperature is not beneficial or desired by the individual.

Whereas mesh materials exhibit a relatively constant air permeability, the air permeability of textile 130 increases when exposed to water, including perspiration. In general, the volume of perspiration increases as the temperature increases. Given that the perspiration will be absorbed or otherwise contact textile 130, the air permeability of textile 130 will effectively increase as the temperature increases. During times when the individual is not perspiring significantly (e.g., during resting, warm-up, and warm-down periods), the air permeability of textile 130 will be relatively low or at a minimum. When the individual is engaging in an athletic activity and perspiring, however, the air permeability of textile 130 will increase to allow air flow through apparel 100 that (a) convects heat away from the individual and (b) promotes evaporative cooling through the removal of perspiration.

Figure 3A:
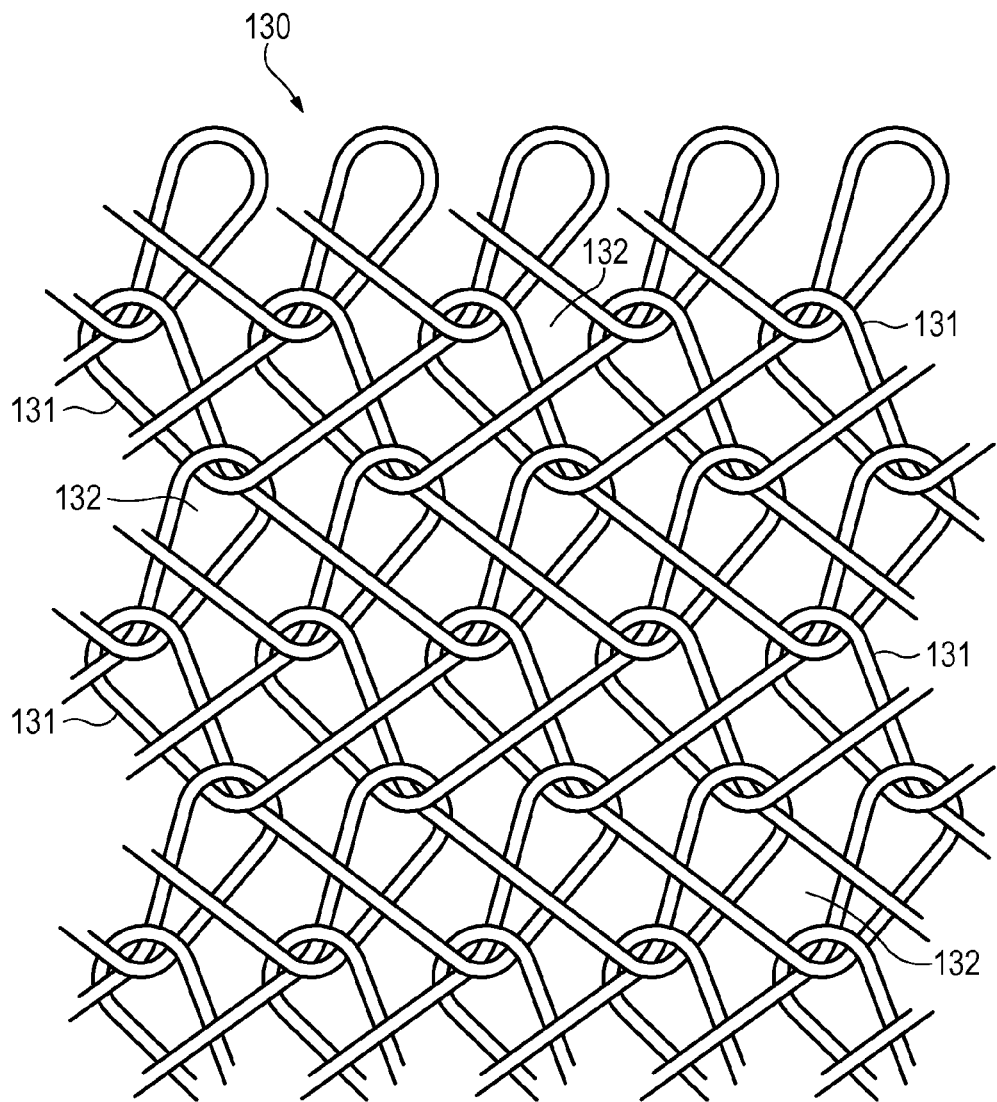
FIGS. 3A and 3B are schematic top plan views of a portion of the textile with a variable air permeability.
Figure 3B:
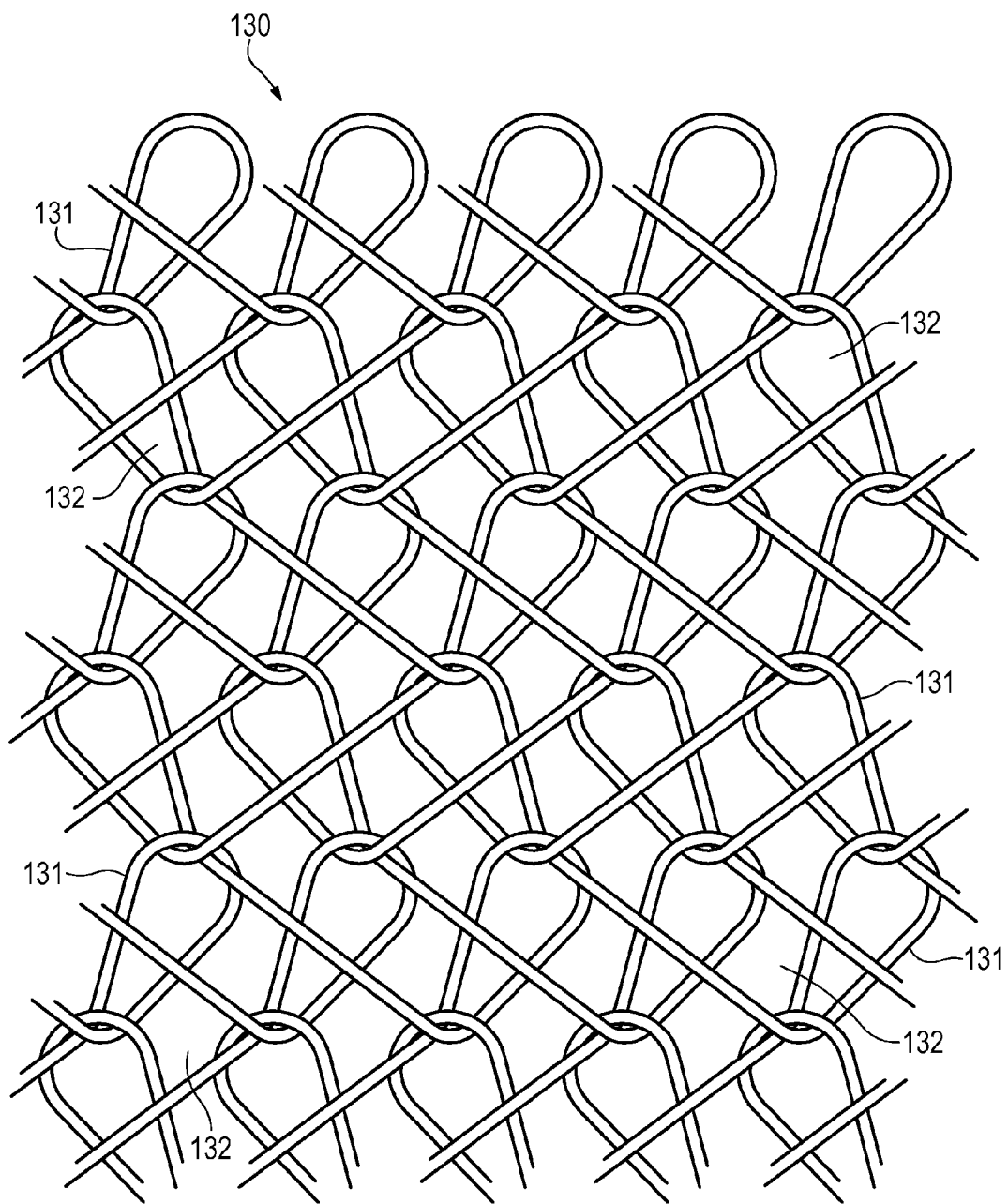

Textile 130 is depicted in FIGS. 3A and 3B as having the configuration of a knitted fabric formed from one or more yarns 131. In general, knitting involves forming intermeshed loops from one of yarns 131 or multiple yarns 131. In production, knitting machines may be programmed to mechanically-manipulate yarns 131 into the configuration of textile 130. That is, textile 130 may be formed by mechanically-manipulating one or more yarns 131 to form a one-piece textile element. Two major categories of knitting techniques are weft-knitting and warp-knitting. Whereas a weft-knit fabric utilizes a single yarn within each course, a warp-knit fabric utilizes a different yarn for every stitch in a course. Although textile 131 may be formed through a variety of different knitting processes, advantages of warp knitting are a more secure structure, relatively easy methods to form apertures or other holes in the fabric, and relatively easy methods to form stretch fabrics that benefit athletic apparel. Examples of specific knitting processes that may be utilized for textile 130 include flat knitting, wide tube circular knitting, narrow tube circular knit jacquard, single knit circular knit jacquard, double knit circular knit jacquard, and warp knit jacquard. In some configurations, textile 130 may be formed from a non-woven material, a woven textile, or an intertwined and twisted textile.

Yarns 131 are formed from one or more filaments or fibers that experience a dimensional transformation when exposed to water. In other words, the dimensions (i.e., one or both of the length and thickness) of yarns 131 change when textile 130 is exposed to water. The dimensional transformation of yarns 131 has an effect upon the structure of textile 130. More particularly, the dimensional transformation of yarns 131 modifies the structure of textile 130 such that various apertures 132 between portions of yarns 131 increase in area. Referring to FIG. 3A, a portion of textile 130 is depicted as being unexposed to water, and the various apertures 132 are relatively small. Referring to FIG. 3B, the portion of textile 130 is depicted as being exposed to water. In this state, yarns 131 transform dimensionally (i.e., increased in length and thickness) such that apertures 132 are increased in area. Exposing textile 130 to water has, therefore, the effects of (a) changing the dimensions of yarns 131 and (b) increasing the area of various apertures 132 between portions of yarns 131. Moreover, increasing the area of apertures 132 has the effect of increasing the air permeability of textile 130.

A variety of materials that transform dimensionally in the presence of water may be utilized for yarns 131. For example, at least a portion of the filaments or fibers in yarns 131 may be formed of a moisture-absorptive polyester material, such as the various moisture-absorptive polyester materials manufactured by Tejin Fibers Limited of Japan. In some configurations, yarns 131 may be entirely formed from moisture-absorptive materials. In other configurations, yarns 131 may be formed from combinations of both moisture-absorptive materials and non-moisture-absorptive materials. For example, yarns 131 may be formed from 50 percent moisture-absorptive polyester materials and 50 percent non-moisture-absorptive polyester materials. As a more specific example, yarns 131 may be a semi-dull cationic polyester 50 percent and nylon 50 percent side-by-side conjugate yarn with a 75 denier, 24 filament structure. Other relatively non-moisture-absorptive polymer fibers or filaments may also be utilized, such as rayon, nylon, and polyacrylic. In addition, silk, cotton, or wool may be utilized in yarns 131. Accordingly, a wide range of materials are suitable for the various yarns 131, but at least a portion of the materials transform dimensionally in the presence of water.

Although textile 130 may incorporate yarns 131, which include a material that transforms dimensionally in the presence of water, yarns from textiles utilized in other portions of apparel 100 may be primarily formed from materials that do not significantly transform dimensionally in the presence of water. Apparel 100 may, therefore, incorporate textiles that react differently to water, and these textiles may be joined to each other (e.g., at seams) in each of back area 112 and side areas 113.

Physiological research indicates that air permeable materials located in side areas and along a back area of a shirt-type garment provide more effective ventilatory cooling for an individual than garments with air permeable materials in other locations. In addition to decreasing the temperature of the individual, the ventilatory cooling also moderates or delays increases in the temperature of the individual when engaging in athletic activities. During athletic activities, the individual may release a significant amount of excess heat in the center back area, and increased air flow in this region effectively (a) convects heat away from the individual and (b) promotes evaporative cooling through the removal of perspiration. Moreover, air permeable materials located in the side areas improves the intake and exhaust of air when the individual is moving in a forward or lateral direction. When air permeable materials are located in the side areas and along the back area of a shirt-type garment, air flows into the shirt-type garment at the side areas, flows around to the back area, and flows out of the shirt-type garment to decrease the temperature through both convection and evaporative cooling.

Physiological research also indicates that materials with an air permeability greater than 279 $cm^3$/second per $cm^2$ (i.e., approximately 550 $ft^3$/minute per $ft^2$) are effective at decreasing the skin temperature of the individual, which may promote overall cooling of the individual. Similarly, materials with an air permeability less than 279 $cm^3$/second per $cm^2$ are less effective at reducing the skin temperature of an individual. As discussed above, textile 130 has a variable air permeability depending upon whether textile 130 is exposed or unexposed to water. During times when the individual is not perspiring significantly, the air permeability of textile 130 will be less than 279 $cm^3$/second per $cm^2$ to retain heat. When the individual is engaging in an athletic activity and perspiring, however, the air permeability of textile 130 will increase to greater than 279 $cm^3$/second per $cm^2$ to allow air flow through apparel 100 that effectively decreases the skin temperature of the individual. Accordingly, textile 130 exhibits (a) a first air permeability when unexposed to water, the first air permeability being less than 279 $cm^3$/second per $cm^2$ and (b) a second air permeability when exposed to water, the second air permeability being greater than 279 $cm^3$/second per $cm^2$. ASTM International of Conshohocken, Pa. in the United States of America issued ASTM D 737, entitled Standard Test Method For Air Permeability Of Textile Fabrics, which provides a suitable test for determining the air permeability of a textile, although various other methods of measuring air permeability are known and may be utilized. In general, ASTM D 737 utilizes a pressure differential of 125 Pa (i.e., 0.0209 $LB/FT^2$) when determining the air permeability.

Textile 130 has a variable air permeability depending upon whether textile 130 is exposed to water or unexposed to water. As discussed above, the air permeability is greater than 279 $cm^3$/second per $cm^2$ when exposed to water, and less than 279 $cm^3$/second per $cm^2$ when unexposed to water, as tested in accordance with ASTM D 737 or other test methods. The degree to which the air permeability of textile 130 changes may, however, vary significantly. In some configurations of textile 130, the air permeability may be 280 $cm^3$/second per $cm^2$ when exposed to water and 278 $cm^3$/second per $cm^2$ when unexposed to water, which is a differential of 2 $cm^3$/second per $cm^2$. In other configurations of textile 130, the differential may be at least 10 $cm^3$/second per $cm^2$, at least 50 $cm^3$/second per $cm^2$, or at least 100 $cm^3$/second per $cm^2$, for example. Given that the variable air permeability of textile 130 produces differences in the degree to which the skin temperature of the individual is cooled, differentials of at least 50 $cm^3$/second per $cm^2$ or at least 100 $cm^3$/second per $cm^2$ impart effective differences in air flow through back area 112 and side areas 113.

The volume of air flow through back area 112 and side areas 113 also depends upon the areas of textile 130 in each of back area 112 and side areas 113. In general, as the area of textile 130 increases, the volume of air flow through back area 112 and side areas 113 also increases. Accordingly, greater air flow is produced by incorporating larger elements of textile 130 into apparel 100. A suitable area of textile 130 in each of back area 112 and side areas 113 is at least 77 cm² (i.e., approximately 12 in²), although the area of textile 130 in each of back area 112 and side areas 113 may also be at least 232 cm² (i.e., approximately 36 in²).

In addition to overall area, the widths of the various elements of textile 130 may also have an effect upon the volume of air flow. For configurations of apparel 100 intended for either men or women, a suitable minimum width of textile 130 in back area 112 ranges from 10-15 centimeters (i.e., approximately 4-6 inches). For configurations of apparel 100 intended for men, a suitable minimum width of textile 130 in side areas 113 is 10 centimeters (i.e., approximately 4 inches). Additionally, for configurations of apparel 100 intended for women, a suitable minimum width of textile 130 in side areas 113 is 7.5 centimeters (i.e., approximately 3 inches).

Based upon the above discussion, apparel 100 incorporates a material with (a) a first air permeability when unexposed to water, the first air permeability being less than 279 cm³/second per cm² measured in accordance with ASTM D 737 and (b) a second air permeability when exposed to water, the second air permeability being greater than 279 cm³/second per cm² measured in accordance with ASTM D 737. The material may be located in any or all of back area 112 and side areas 113, and the material may be a textile that includes yarns that transform dimensionally in the presence of water. U.S. Patent Application Publication 2005/0204449 to Baron, et al., which is incorporated herein by reference, discloses additional information, features, or configurations that may be utilized for either of apparel 100 and textile 130.

Further Apparel Configurations

Figure 4A:
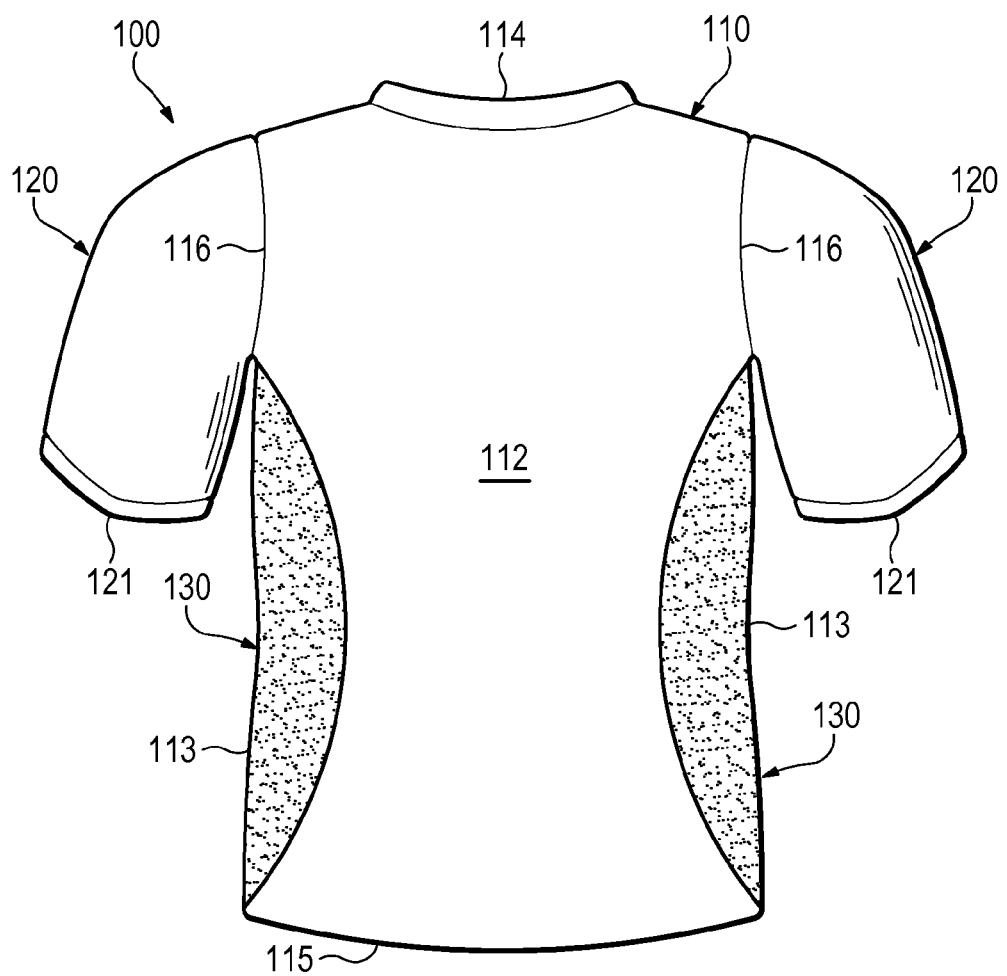
FIGS. 4A-4F are rear elevational views of further configurations of the article of apparel.
Figure 4B:
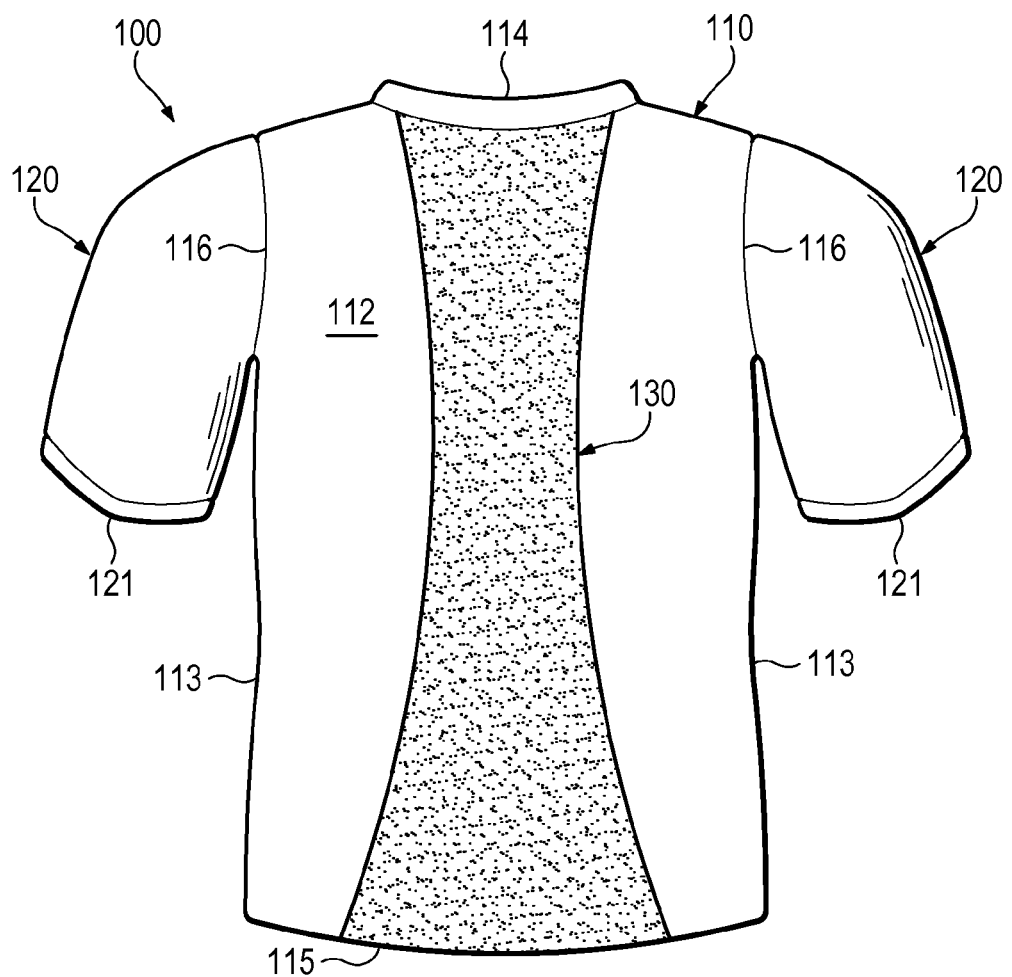
Figure 4C:
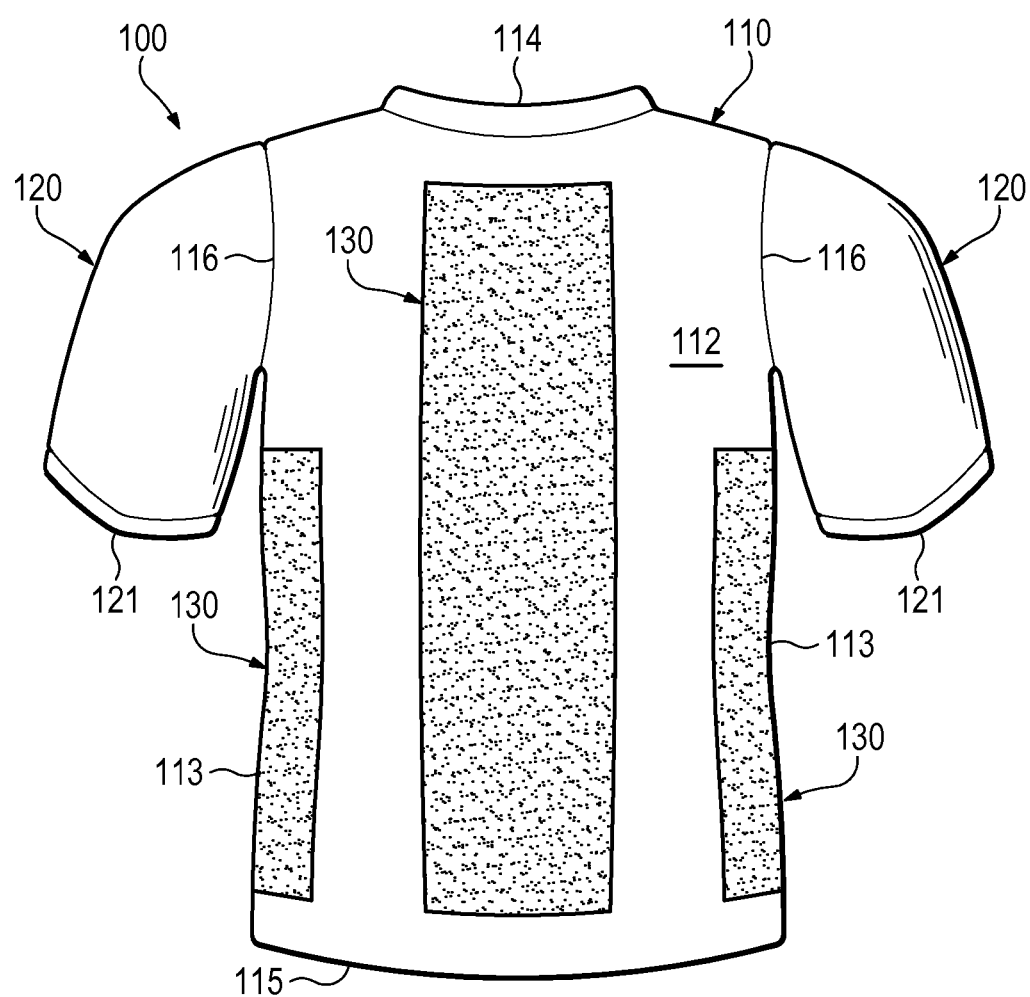

Apparel 100, as depicted in FIGS. 1 and 3, exhibits an example of a configuration for a shirt-type garment that incorporates textile 130. Apparel 100 or other articles of apparel incorporating textile 130 may, however, have a variety of other configurations. Referring to FIG. 4A, apparel 100 has a configuration wherein textile 130 is located in each of side areas 113, but is absent from back area 112. An opposite configuration is depicted in FIG. 4B, wherein textile 130 is located in back area 112, but is absent from each of side areas 113. The shapes of the elements of textile 130 may also vary significantly. Whereas the elements of textile 130 in FIGS. 1 and 2 have a generally elongate configuration with curved edges that extend in a vertical direction, FIG. 4C depicts a configuration wherein the elements of textile 130 have rectangular shapes with straight edges, but the elements of textile 130 may also be circular, elliptical, triangular, square, pentagonal, hexagonal, or a variety of other regular, non-regular or irregular shapes.

Figure 4D:
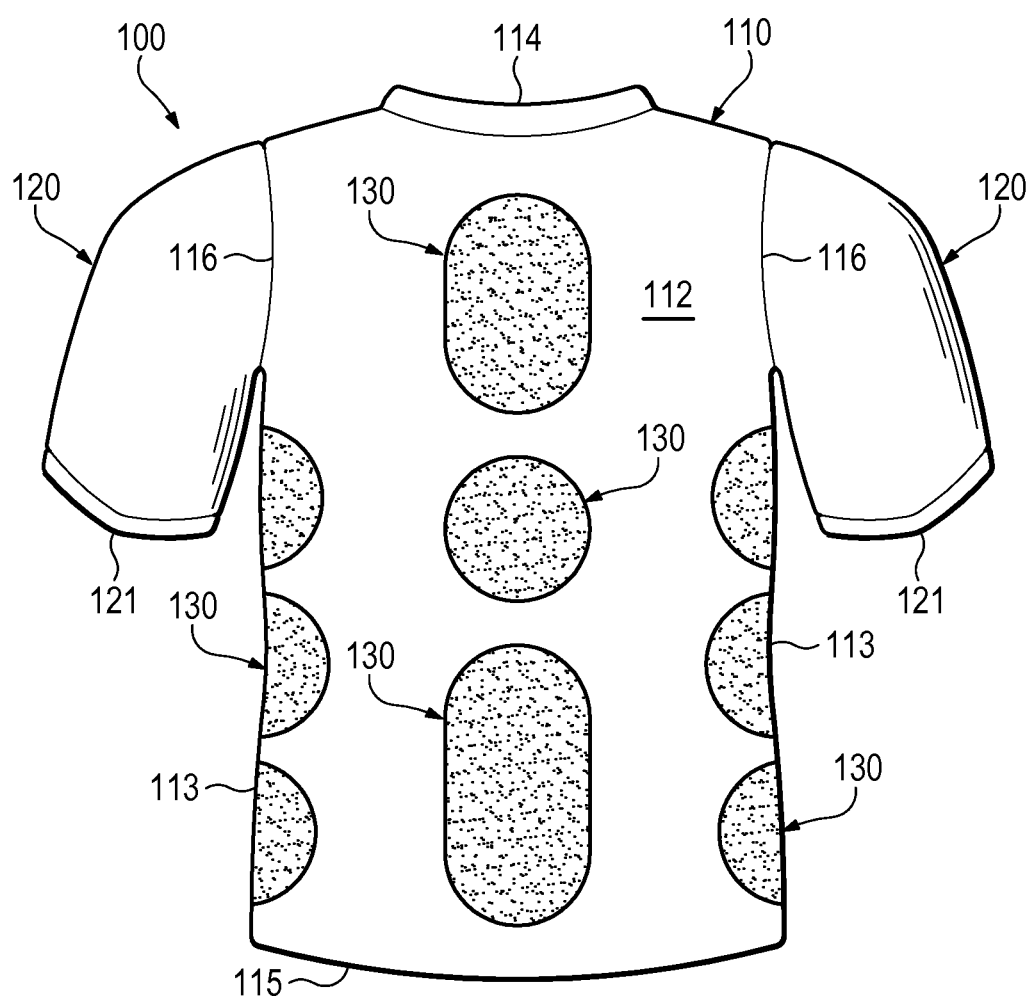

In FIGS. 1 and 2, the element of textile 130 in back area 112 extends from neck opening 114 to waist opening 115, and the elements of textile 130 in side areas 113 extend from each of arm openings 116 to waist opening 115. The configuration of apparel 100 depicted in FIG. 4C exhibits a configuration wherein the elements of textile 130 are spaced from neck opening 114, waist opening 115, and arm openings 116. Although the elements of textile 130 are spaced from openings 114, 115, and 116, the element of textile 130 in back area 112 is depicted as extending through approximately eighty-five percent of a distance between neck opening 114 and waist opening 115, and the elements of textile 130 in side areas 113 are depicted as extending through approximately eighty percent of a distance between arm openings 116 and waist opening 115. In other configurations, textile 130 may extend through at least twenty percent, at least fifty percent, or at least seventy percent of the distances between openings 114, 115, and 116. As discussed above, the volume of air flow through back area 112 and side areas 113 partially depends upon the areas of textile 130 in each of back area 112 and side areas 113. An advantage to configurations where the elements of textile 130 extend through at least fifty percent of the distances between openings 114, 115, and 116 is that apparel 100 generally has sufficient air flow to promote cooling of the skin temperature of the individual. FIG. 4D depicts another configuration of apparel 100, wherein multiple generally circular or elliptical elements of textile 130 are located in back area 112 and side areas 113. In this configuration, the multiple elements of textile 130 cooperatively extend through a majority of the distances between openings 114, 115, and 116.

Figure 4E:
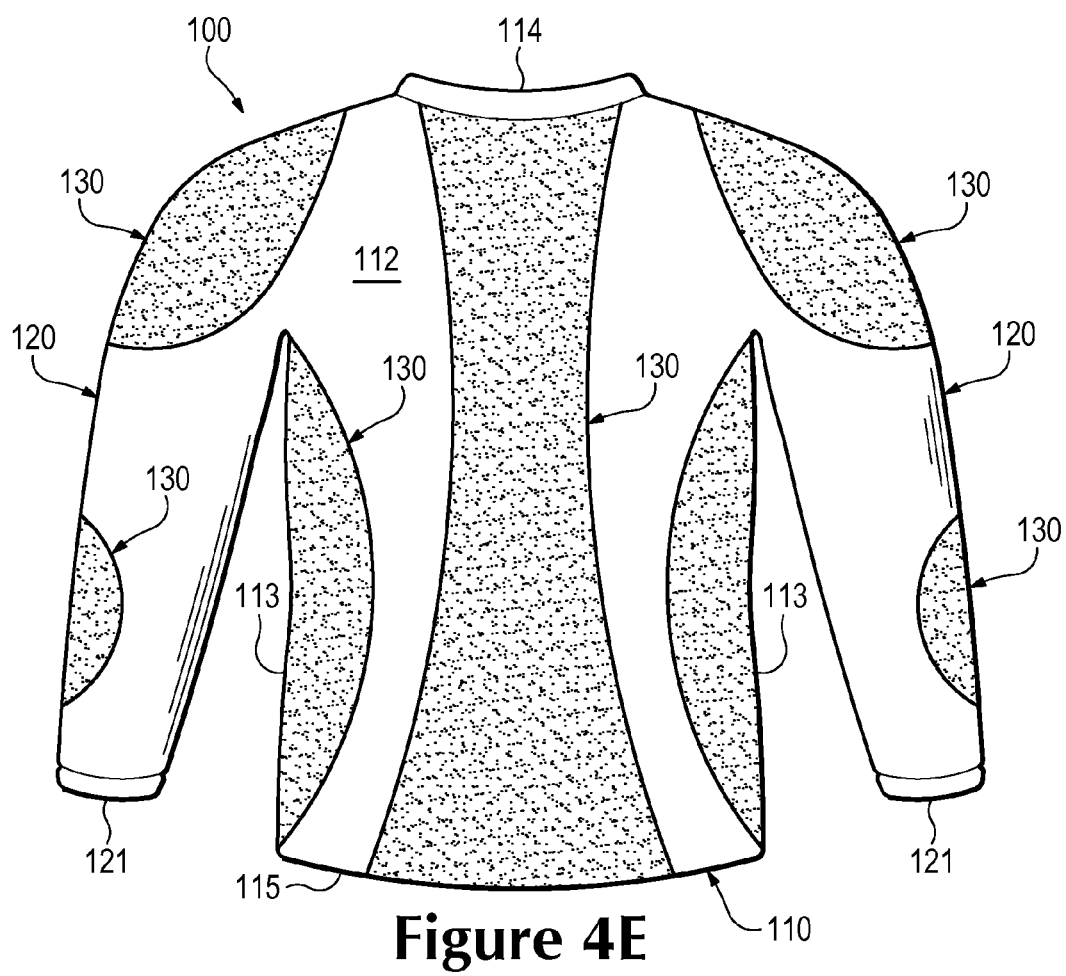
Figure 4F:
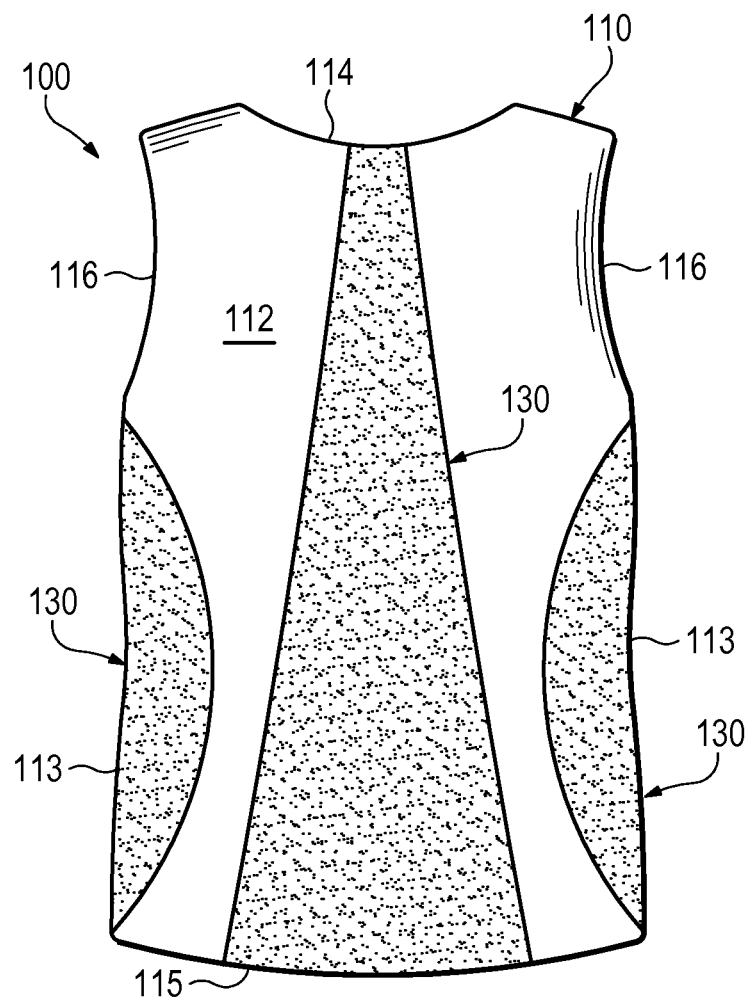

Apparel 100 is depicted in FIGS. 1 and 2 as having the configuration of a shirt-type garment, particularly a short-sleeved shirt. Referring to FIG. 4E, apparel 100 has the configuration of a long-sleeved shirt. Although this configuration of apparel 100 includes textile 130 in back area 112 and each of side areas 113, additional elements of textile 130 are located in arm regions 120. Accordingly, textile 130 may be located in various areas of apparel 100, in addition to back area 112 and each of side areas 113. Referring to FIG. 4F, apparel 100 has the configuration of a tank top, in which arm regions 120 are absent. As with other configurations of apparel 100, however, this configuration includes textile 130 in back area 112 and each of side areas 113. In further configurations, apparel having the general structure of apparel 100 and incorporating concepts discussed above for apparel 100 may have the configuration of other shirt-type garments, including undershirts, jackets, or coats.

Figure 5:
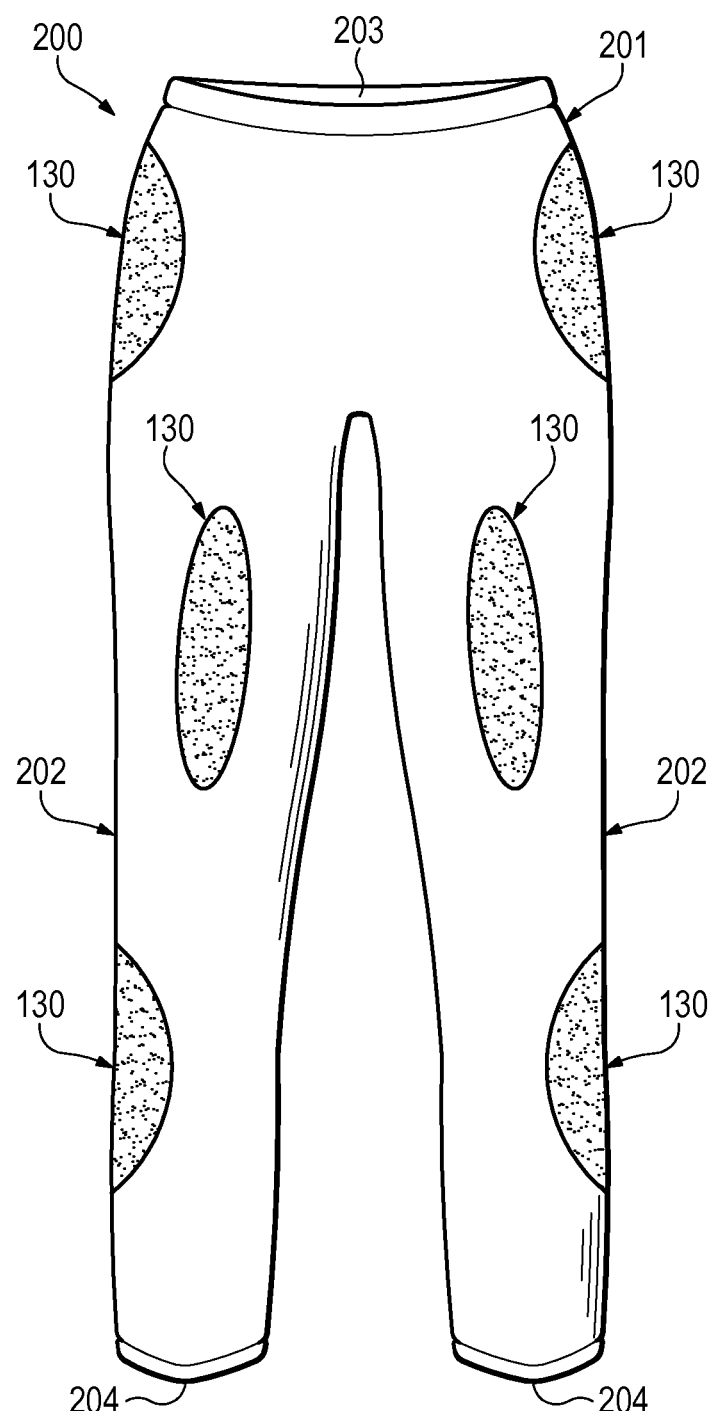
FIG. 5 is a front elevational view of another article of apparel incorporating the textile with a variable air permeability.
Figure 6:
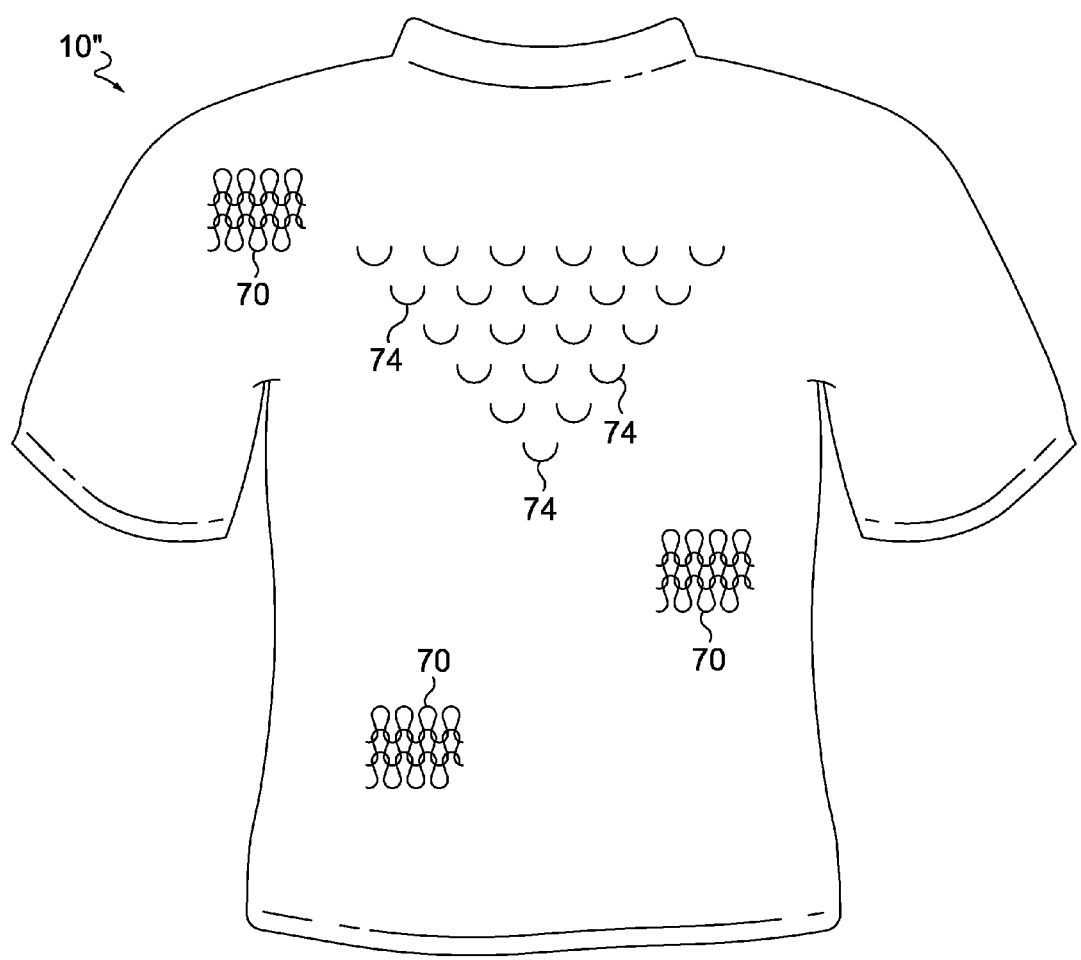
FIG. 6 is a plan view of an article of apparel incorporating an altered textile structure.

As another example of an apparel configuration, an article of apparel 200 having the configuration of a pants-type garment is depicted in FIG. 5. Apparel 200 includes a pelvic region 201 and a pair of leg regions 202 that extend downward from pelvic region 201. Pelvic region 201 corresponds with a pelvic area of a wearer and covers at least a portion of the pelvic area when worn. An upper area of pelvic region 201 defines a waist opening 203 that extends around the waist when apparel 200 is worn. Leg regions 202 correspond with a right leg and a left leg of the wearer and cover at least a portion of the legs. Each of leg regions 202 define an ankle opening 204 through which a foot and ankle of the wearer protrude when apparel 200 is worn. As with apparel 100, apparel 200 includes various elements of textile 130. More particularly, the elements of textile 130 are located in the sides of pelvic region 201, in the thigh-areas of leg regions 202, and on the sides of lower portions of leg regions 202, but may also be located in other areas. Accordingly, apparel incorporating textile 130 may also have the configurations of other types of apparel.

The above discussion of apparel 100 relates to the use of apparel 100 during various athletic activities, which includes both practice sessions and competitions. Although apparel 100 or other articles of apparel incorporating the concepts discussed above may be utilized for athletic activities, apparel 100 may also be utilized during various non-athletic activities to promote cooling of the temperature of an individual. During a variety of non-athletic activities (e.g., driving, shopping, gardening, reading, etc.), the skin temperature of the individual may rise as the exertion level or various environmental factors (e.g., temperature, humidity) increase, and apparel similar to apparel 100 may be worn to promote cooling. Accordingly, articles of apparel that incorporate textile 130 may be manufactured and utilized for a variety of activities, whether athletic or non-athletic.

Figure 7:
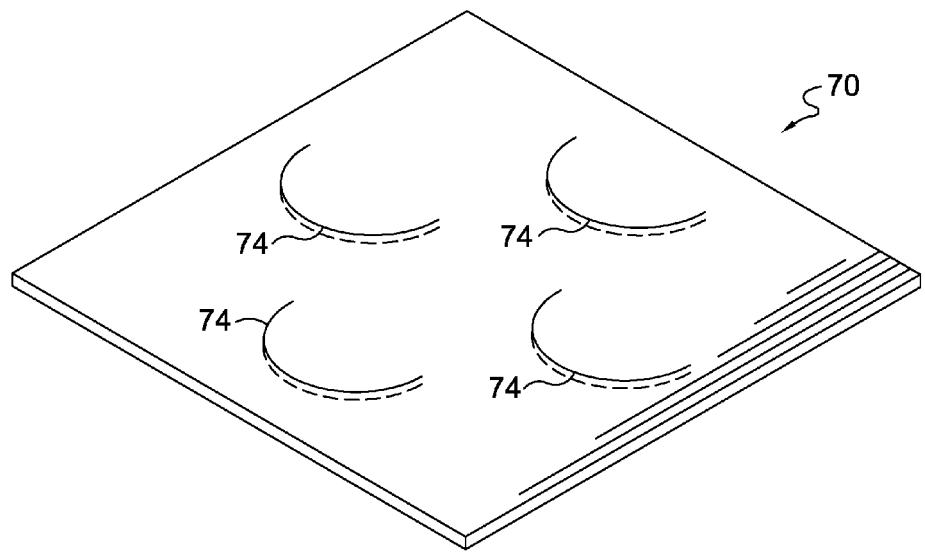
FIG. 7 is a perspective view of a portion of the altered textile structure of FIG. 6 in an unexposed state.
Figure 8:
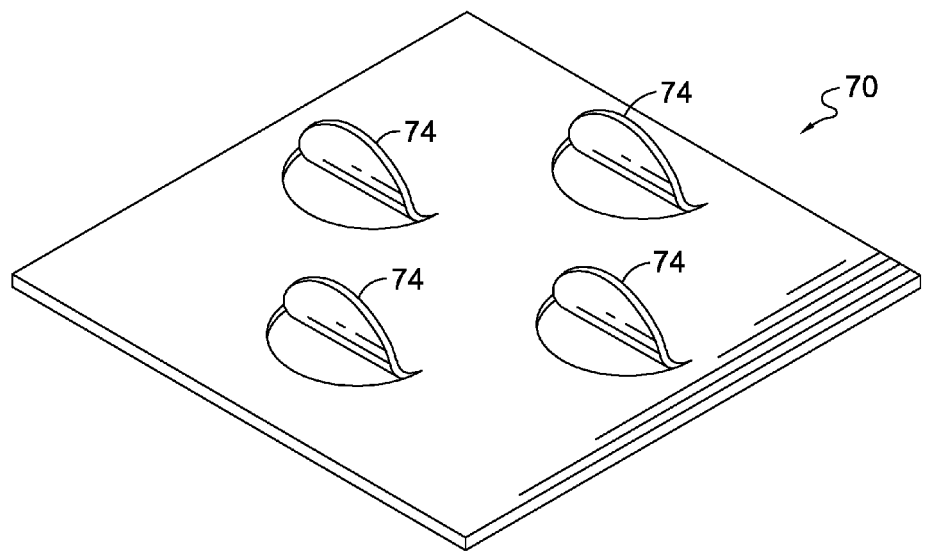
FIG. 8 is a perspective view of the portion of the altered textile structure of FIG. 6 in an exposed state.

FIG. 7 depicts an article of apparel 10" that is substantially formed from textile 70. A plurality of semi-circular incisions 74 extend through textile 74 and, therefore, extend through each of yarns 71 and 72. With reference to FIG. 7, a portion of textile 70 having incisions 74 is depicted in an unexposed state, in which yarns 71 and 72 are not exposed to the physical stimulus. With reference to FIG. 8, however, textile 70 is depicted in an exposed state, in which yarns 71 and 72 are exposed to the physical stimulus. In the unexposed state, textile 70 lies relatively flat and a flap that is formed by incisions 74 is in a closed configuration. In the exposed state, however, the flaps that are formed by incisions 74 curl upward and form apertures in textile 70, thereby modifying the structure and properties of textile 70.

The alteration in the structure of textile 70 (i.e., the formation of incisions 74) changes the properties of textile 70. In the unexposed state, textile 70 lies flat and incisions 74 do not form apertures. In the exposed state, however, the flaps formed by incisions 74 curl upward to form apertures in textile 70, which permit increased air flow between the exterior and interior of apparel 10". Exposing textile 70 to a physical stimulus not only increases the texture of textile 70, as discussed above, but also increases the air flow properties of textile 70.

Textile 70 is structured such that yarn 71 is concentrated on a first surface and yarn 72 is concentrated on a second opposite surface. When exposed to the physical stimulus, such as water or a change in temperature, for example, yarn 71 transforms dimensionally and increases in size. The increase in the size of textile 70 dues to an increase in the size of yarn 71 is constrained by the relative dimensional-stability of yarn 72. Accordingly, the swelling of yarn 71 caused by exposure to water causes the flaps formed by incisions 74 to curl upward and toward the second surface where yarn 72 is concentrated.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. An article of apparel in the form of a shirt and comprising:

a torso region having a front area, a back area, a first arm opening and a second arm opening, a first side area extending from proximate the first arm opening to proximate a waist opening of the article of apparel, and a second side area extending from proximate the second arm opening to proximate the waist opening of the article of apparel, at least the front area, back area, and first and second side areas adapted for covering a torso of a wearer when the article of apparel is in an as-worn configuration; and a pair of arm regions extending from the torso region and adapted for receiving arms of the wearer when the article of apparel is in the as-worn configuration, wherein the article of apparel is formed from at least a first material and a second material different from the first material, the first material extending in a vertical direction along a central portion of the back area, and the first material extending along the first and second side areas, the first material including a dimensionally transformative yarn formed at least from filaments of a moisture-absorbing polyester material that exhibits a dimensional transformation upon absorbing water and a dimensionally stable yarn formed from filaments of a non-absorptive polyester material that is dimensionally stable upon exposure to water, wherein the first material is a double-knit material having a first surface and an opposite second surface, the dimensionally transformative yarn being primarily positioned at the first surface, and the dimensionally stable yarn being primarily positioned at the second surface, wherein a plurality of curved slits are formed in the first material to form a plurality of flaps, and wherein the plurality of flaps are configured to curl toward the second surface of the first material upon exposure to water, and wherein the first material has a first air permeability when unexposed to the water and a second air permeability when exposed to the water, wherein the first air permeability is less than the second air permeability.

2. The article of apparel recited in claim 1, wherein the first material is a warp knit textile.

3. The article of apparel recited in claim 1, wherein the extent of the first material in the central portion of the back area and in each of the first and second side areas is at least 77 cm2.

4. The article of apparel recited in claim 1, wherein the first material and the second material are joined to each other in each of the first and second side areas and in the back area.

5. The article of apparel recited in claim 1, wherein the second material forms a majority of the article of apparel.

* * * * *